Oct. 29, 1957     W. L. CORRELL     2,811,181

RADIATOR FILLING DEVICE

Filed Oct. 17, 1955

INVENTOR
William L. Correll

BY Kenyon and Palmer

ATTORNEYS

United States Patent Office 2,811,181
Patented Oct. 29, 1957

2,811,181
RADIATOR FILLING DEVICE

William L. Correll, Ephrata, Wash., assignor of one-half to Dallas V. Groff, Ephrata, Wash.

Application October 17, 1955, Serial No. 540,690

2 Claims. (Cl. 141—340)

This invention relates to a radiator filling device to be used as an aid to prevent spilling or overflowing during the pouring of liquids or granular solids into the cooling radiators of automobiles or other motor vehicles.

Pouring water into the radiator of an automobile usually presents no problem because if any of the water overflows or is spilled during the radiator filling, it will not damage any of the parts of the automobile. In contrast, pouring anti-freeze liquids or dry granular flushing chemicals into automobile radiators can be troublesome, particularly to busy gasoline filling stations, because spilling such liquids while filling the radiator can cause damage to the paint or the motor parts of the car. Thus, even if anti-freeze liquid is not spilled onto the automobile body so as to injure the finish or paint, overflowing of the radiator can cause damage to motor parts, such as electrical wiring, since the fan of the motor can blow the surplus anti-freeze liquid back over the motor and its wiring system. Likewise, dry granular flushing chemicals do not pour readily and are of a highly corrosive nature which will damage any painted surface they might come in contact with.

A principal object of this invention is the provision of new radiator filling devices. A further object is the provision of a device which may be quickly and easily used, particularly by gasoline station attendants, for pouring materials which may be injurious to automobile body finishes or parts into the liquid cooling radiator of the automobile to prevent spilling or overflowing of the material during the radiator filling operation.

These objects are accomplished according to the present invention by the provision of a radiator filling device which is very easy to use, and at the same time, is very effective in preventing a spilling or overflowing of liquid during the filling of radiators of automobiles or other motor vehicles, such as farm tractors or the like. The details of the new devices can be readily understood by reference to the accompanying drawings in which.

Figure 1:
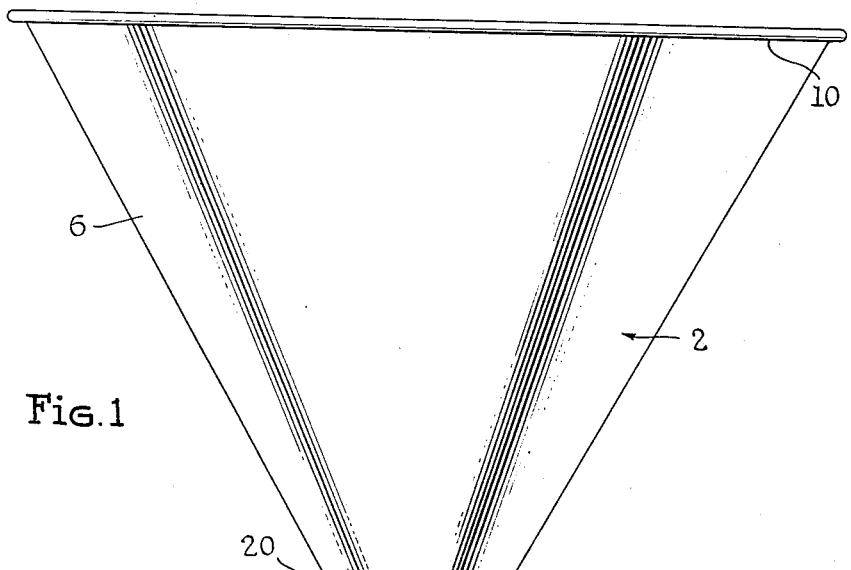
Fig. 1 is a side view of a radiator filling device of this invention.
Figure 2:
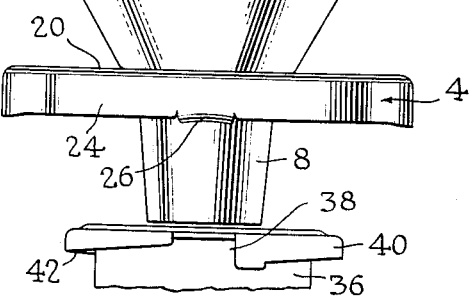
Fig. 2 is a bottom plan view of the filling device of Fig. 1.

Referring in detail to the drawings, the device consists primarily of a short stemmed metal funnel 2 and a radiator cap 4 of the inwardly extending bayonet lug type. The funnel member 2 comprises an upper truncated conical metal section 6 and a lower truncated conical metal section 8 which is shorter in height and which has a smaller apical angle than the upper section 6. The top end 10 of upper section 6 is rolled in order to strenghten it.

The apical end 12 of section 6 has a short inwardly extending flange 14 and the base end 16 of lower section 8 has a corresponding outwardly extending flange 18. The flanges 14 and 18 are fitted together and the lower section 8 is fastened to upper section 6 by soldering or welding the two together at the abutting flanges.

The top 4 comprises a ring member 20 which has a central hole 22 therein through which lower section 8 extends. This hole is of such size that it fits snugly around the base 16 of lower section 8 and the ring member 20 is fastened, such as by soldering or welding, to the lower section 8 and the flange 14 of the upper section 6. The peripheral portion 24 is turned in normally of the plane of the ring member 20 toward the apical end of the lower section 8, so that a depending rim is formed on the ring member 20. A pair of diametrically opposed semi-circular lugs 26 extend in from the lower end of the rim 24 substantially parallel to the plane of ring member 20. A pair of diametrically opposed extensions 28 are also formed in the periphery of the ring member 20 to serve as short handles for use in tightening or loosening the device upon the neck of a radiator.

A concentric circular groove 30 is formed in the ring member 20 with a land portion 32 which extends below the plane of the ring member away from the upper section 6. A resilient ring gasket 34 of pressed cork composition or the like is fitted inside the rim 24 above the lugs 26 so as to cover the land portion 32 of groove 30.

To use the new device, the lower section 8 is inserted into a radiator neck 36 so that the lugs 26 pass through the slots 38 of the external flange 40 of the radiator neck 36. The ring member 20 is then twisted, using the handle members 28 so that the lugs 26 engage the downwardly tapered edge 42 of external flange 40, forcing the ring member 20 toward the radiator neck 36 and compressing the gasket 34 between the top of the radiator neck and the land portion 32 of the ring groove 30. In this position, liquid to be used in filling the radiator can easily be poured into the wide end 10 of the upper section 6 and the sections 6 and 8 will direct the liquid down into the radiator neck 36.

Figure 3:
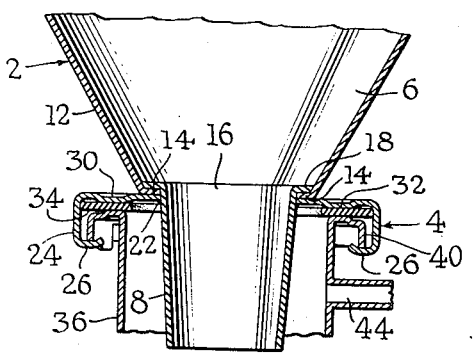
Fig. 3 is a fragmentary sectional side view of the filling device of Fig. 1, showing it clamped to the filling neck of an automobile radiator.

If too much liquid is accidentally used in filling the radiator, the excess cannot flow out over the top of the radiator neck because of the fluid tight seal formed by the ring member 20 and the resilient gasket 34. Instead, the excess liquid will be confined within the pouring device until it is able to flow out of the vent pipe 44, which is customarily a part of the radiator system of an automobile. As can be seen by referring to Fig. 3, the lower section 8 of the filling device directs the filling liquid into the radiator so that no liquid will pass out the vent pipe 44 unless an excess is accidentally used in filling the radiator. This prevents expensive radiator filling liquids, such as permanent anti-freeze, from being wasted.

After the radiator has been properly filled, the new filling device is removed by untwisting ring member 20 and lifting the device from the radiator neck 36.

I claim:

1. A device for use in filling motor vehicle liquid cooling radiators provided with a vented inlet neck of the bi-slotted external flange closure holding type which comprises a metal funnel which has an upper, tapered pouring section and a lower tapered short stem, the bottom edge of said pouring section being turned in, forming an inwardly extending flange, and the top edge of said stem being turned out forming an outwardly extending flange, said flanges being soldered to one another in abutting engagement to hold the pouring section and stem together, a radiator cap of the inwardly extending bayonet lug type having a central hole therein just large enough to permit the cap to slide over said stem, but not large enough to pass over said outwardly extending flange, said cap being fitted over the funnel stem and soldered to the lowermost of said abutting flanges, and a ring gasket carried in said cap between its lugs and top.

2. A device for use in filling liquid cooling radiators of automobiles to prevent liquids from spilling over onto the automobile during the filling, which comprises an upper truncated conical metal section haivng a rolled edge base and an inwardly extending flange on the apical end thereof, a lower truncated conical metal section of shorter height and smaller apical angle than said upper section, the base end of the lower section being turned out forming an outwardly extending flange which abuts and is soldered to said inwardly extending flange of said upper section, a ring member which fits snugly around the base of said lower section, said member being soldered to said inwardly extending flange of said upper section, the periphery of the ring member being turned in normally of the plane of the member toward the apical end of the lower section forming a depending rim thereon, a pair of diametrically opposed semi-circular lugs extending inwardly from the lower end of said rim substantially parallel to the plane of said member, a circular concentric groove in said member having a land portion which extends below the plane of the ring member away from said upper section, and a resilient ring gasket fitted inside said rim above said lugs and covering said land portion.

References Cited in the file of this patent

UNITED STATES PATENTS

| | | |
|---|---|---|
| 1,046,881 | Smith | Dec. 10, 1912 |
| 1,396,606 | Vincent | Nov. 8, 1921 |
| 1,715,328 | Joncha | May 28, 1929 |
| 2,077,306 | Braun | Apr. 13, 1937 |
| 2,168,395 | Damkroger | Aug. 8, 1939 |